United States Patent
Kröger et al.

(10) Patent No.: US 8,160,843 B2
(45) Date of Patent: Apr. 17, 2012

(54) DEVICE AND METHOD FOR PLANNING A PRODUCTION UNIT

(75) Inventors: Reinhold Kröger, Vettelschoss (DE); Holger Machens, Wiesbaden (DE)

(73) Assignee: Siemens Aktiegesellschaft, Munich (DE)

( * ) Notice: Subject to any disclaimer, the term of this patent is extended or adjusted under 35 U.S.C. 154(b) by 714 days.

(21) Appl. No.: 12/287,206

(22) Filed: Oct. 7, 2008

(65) Prior Publication Data
US 2009/0112342 A1 Apr. 30, 2009

(30) Foreign Application Priority Data
Oct. 11, 2007 (EP) .................................. 07019950

(51) Int. Cl.
*G06F 17/50* (2006.01)
(52) U.S. Cl. ........................................................ 703/1
(58) Field of Classification Search ...................... 703/1
See application file for complete search history.

(56) References Cited

U.S. PATENT DOCUMENTS

| | | | | |
|---|---|---|---|---|
| 5,586,038 A * | 12/1996 | Nagaoka | | 700/95 |
| 5,596,502 A * | 1/1997 | Koski et al. | | 700/95 |
| 6,209,033 B1 * | 3/2001 | Datta et al. | | 709/224 |
| 6,651,110 B1 * | 11/2003 | Caspers et al. | | 710/13 |
| 6,928,396 B2 * | 8/2005 | Thackston | | 703/1 |
| 2003/0011846 A1 * | 1/2003 | Gholamhosseini et al. | ... | 359/135 |
| 2004/0117166 A1 * | 6/2004 | Cassiolato | | 703/13 |
| 2005/0089027 A1 * | 4/2005 | Colton | | 370/380 |
| 2005/0193269 A1 * | 9/2005 | Haswell et al. | | 714/38 |
| 2006/0004543 A1 * | 1/2006 | Vogel et al. | | 702/182 |
| 2007/0198588 A1 * | 8/2007 | Moritz et al. | | 707/104.1 |

FOREIGN PATENT DOCUMENTS

| | | |
|---|---|---|
| EP | 1 624 614 A1 | 2/2006 |
| EP | 1 402 325 B1 | 9/2006 |
| WO | WO 02/101596 A2 | 12/2002 |
| WO | WO 2004/053739 A2 | 6/2004 |

OTHER PUBLICATIONS

Ralph Lorentzen, "Optimization-Based Network Planning Tools in Telenor During the Last 15 Years -A Survey", Telektronikk, Mar. 4th 2003, pp. 47-67.*
Machens et al., "Fachhochschle Wiesbaden: AD Extension Package for Network Planning", Systemspezifikation, Version 0.1, Jul. 10, 2006; pp. 1-15; XP 009130107.
Machens et al., "Fachhochschule Wiesbaden, AD Extension Package for Network Planning"; User Manual, Vers. 0.3, Mar. 28, 2007, pp. 1-21; XP009130108.
Wolfgang Kühn; Digitale Fabrik, Fabriksimulation für Produktionsplaner; München/Wien; Karl-Hanser-Verlag; Book; 2006.
Maximilian Sackerer, Wolfgang Schlögl; Von der digitalen Fabrik zur realen Produktion; 10 S.

(Continued)

*Primary Examiner* — Dwin M Craig

(57) ABSTRACT

A device for planning a production unit with a production building and a manufacturing facility, wherein the manufacturing facility has machines with equipment for automation systems integrated at least partially in a communication network, wherein the device has a product data management system, in which data relating to the product to be manufactured and further manufacture-related data is stored in a database and with planning tools that are called up from a planning platform which allow at least partially virtual mapping of the product, the production building and the manufacturing facility by accessing the database, a network planning tool for the communication network being integrated in the planning platform, data characterizing the communication network being available based upon the product data management system.

12 Claims, 1 Drawing Sheet

OTHER PUBLICATIONS

Tilman Walther (Klaus-Peter Löhr, Karl Pauls); Architektur and Konzepte von Eclipse 3; Ausarbeitung im Rahmen des Seminars "Komponentenbasierte Softwareentwicklung"; Freie Universität Berlin, WS 2004/2005; www.tilman.de/uni/Eclipse3.pdf; Berlin; 2004.

Cheng Leong Ang: "Technical Planning of Factory Data Communications Systems", Computers in Industry, (online) Bd. 9, No. 2, pp. 93-105, XP002471457, found in the internet: URL:http://www.sciencedirect.com/science/article/B6V2D-482B5F5-1H/2/c6585cd0cd2d765c9314b6855f7fbee (found on Mar. 1, 2008), table 1-5, fig 1; 1987; NL.

Dong-Sung Kim et al: "Virtual factory communication system and its application to networked factory machine", Industrial Electronics Society, 2004, IECON 2004, 30th annual conference of IEEE Busan, South Korea, Nov. 2-6, 2004, Piscataway, NJ, USA, IEEE, Nov. 2, 2004 (2004-11-92), pp. 2389-2393, XP010799333, ISBN: 0-7803-8730-9; 2004; KR.

Myoung K, et al: "Implementation of virtual factory using MMS companion standard", Factory Communication Systems, 2002, 4th IEEE International Workshop on Aug 28-30, 2002, Picataway, NJ, USA, IEEE, Aug. 28, 2002, pp. 47-53, XP010623292, ISBN: 0-7803-7586-6; 2002; KR.

* cited by examiner

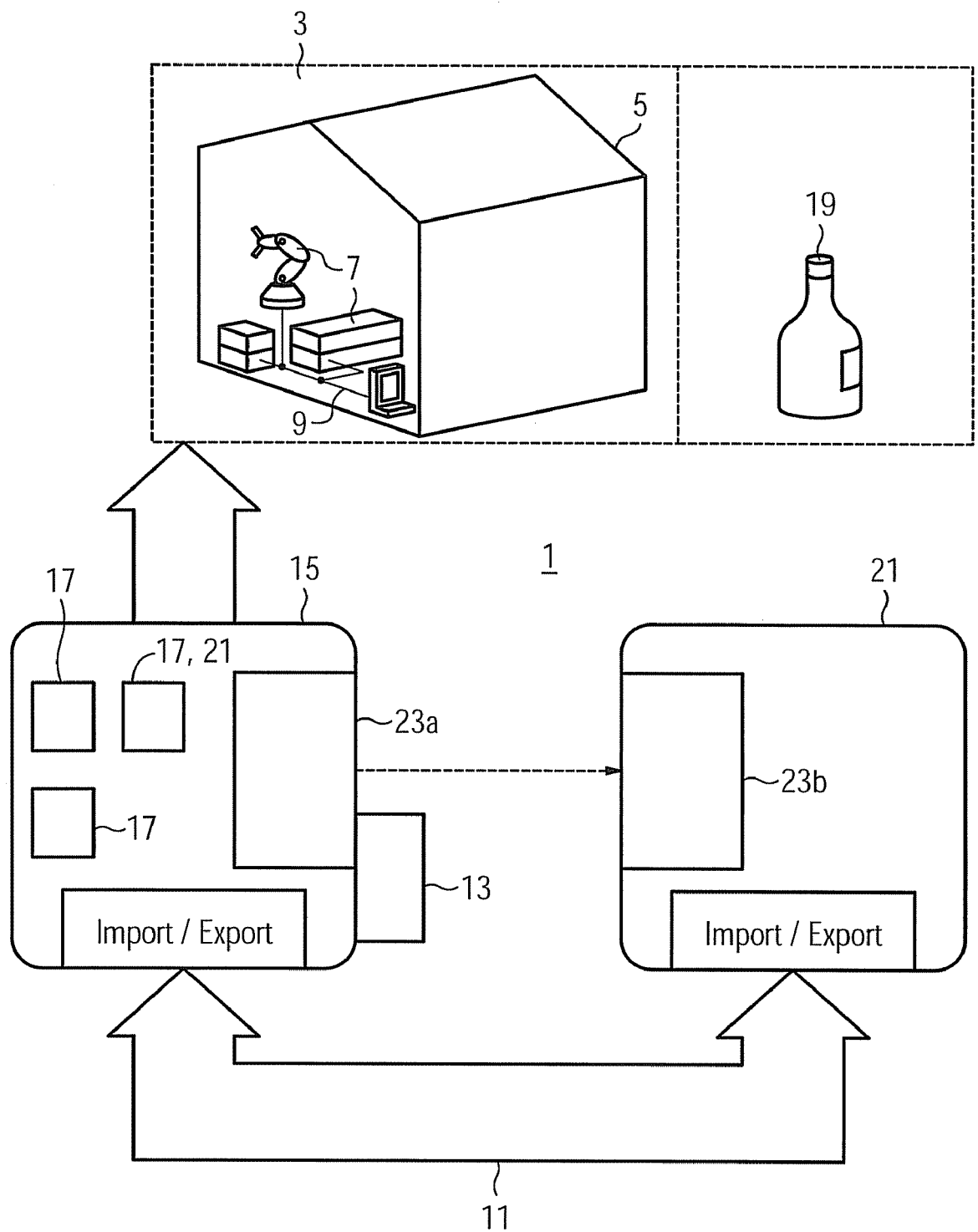

DEVICE AND METHOD FOR PLANNING A PRODUCTION UNIT

CROSS REFERENCE TO RELATED APPLICATIONS

This application claims priority of European Patent Office application No. 07019950.0 EP filed Oct. 11, 2007, which is incorporated by reference herein in its entirety.

FIELD OF INVENTION

The invention relates to a device for planning a production unit in a production building with manufacturing machines equipped with automation systems and integrated in a communication network.

BACKGROUND OF INVENTION

The success of a production company depends essentially on the speed with which market requirements are identified and implemented. Existing manufacturing facilities have to adapt to rapidly changing conditions. It must be possible to set up new units quickly and with a high level of certainty in respect of planning. The term "digital factory" encompasses increasingly comprehensive production planning, closely interlinked with product development as well as further processes and resources, such as logistics and operating materials, and even HR planning. An extremely complex planning environment results, whose functioning is essentially dependent on defined interfaces and standard data models. An overview of this field can be found for example in the book "Digitale Fabrik, Fabriksimulation für Produktionsplaner" (Digital factory, factory simulation for production planners) by Wolfgang Kühn, Karl-Hanser-Verlag Munich/Vienna, 2006. By transferring all aspects of the production unit into simulation models to the greatest possible degree, it is possible to safeguard investments at an early stage with only a short time before a production unit is set up and commissioned. One aspect is the simulation of automation systems. In WO 2004/053739 A2 a system and method are described, with which automation code is generated based on existing descriptions of a unit structure. The components of the unit are represented here by function blocks and have ports for data transmission. Signals, which are assigned to the function blocks, are transmitted by way of the ports. In known simulations automation devices are only linked at a logical level. Actual physical communication networks are not considered.

EP 1 402 325 B1 discloses a method for supporting project planning for manufacturing units. Here the manufacturing unit is mapped as a digital model containing objects. This digital model is embedded into a simulation environment for analysis. For a realistic simulation the model contains geometric data, kinematic data or control-related function blocks for example. A communication network is not mapped.

Automatic planning of network configurations is described in EP 1 624 614 A1. Complex networks are planned here in particular by breaking them down into sub-problems. With such a breakdown it is possible, even for systems with more than a thousand subscribers, to design a network in respect of its delay, cost and maximum data load constraints.

SUMMARY OF INVENTION

An object of the invention is to specify a device and method for planning a production unit, with which a particularly high level of simulation accuracy is achieved.

A reliable simulation or mapping of a production unit requires the most complete and comprehensive consideration possible of all relevant components. In particular until now the important influence of a communication network on the processes within a production unit was underestimated or ignored. The problem was only addressed by linking communicating components in a hugely simplified manner. Influences on real-time behavior for example due to communication delays or availability, even down to matters such as cable guides, in the real world can however influence processes to such a degree that major deviations and planning errors can result if they are not taken into account properly in the simulation.

There is described a device for planning a production unit, the production unit having a production building and manufacturing facilities, said manufacturing facilities also have machines with equipment for automation systems integrated at least partially in a communication network, with a product data management system, in which data relating to the product to be manufactured and further manufacture-related data is stored in a database, and with planning tools that can be called up from a planning platform, which allow at least partially virtual mapping of the product, the production building and the manufacturing facilities by accessing the database, a network planning tool for the communication network being integrated in the planning platform and data characterizing the communication network being available by way of the product data management system.

By integrating the network planning tool in the planning platform it is possible for the first time to take the influences of the communication network into account in the overall planning of the production unit.

The planning platform preferably has a plug-in architecture, with the network planning tool integrated as a plug-in.

The following data, which characterizes the communication network, is preferably available by way of the product data management system as an input for the network planning tool:
a) a list of network elements that can be used,
b) the positions of the network adapters of all the automation devices,
c) the logical configuration of the automation devices, from which the communication protocols used result and therefore the induced network load,
d) the logical grouping of automation devices,
e) the quality-of-service requirements of the user,
f) the maximum permissible costs,
g) the restrictions for laying network cables and
h) network topology criteria.

The following data, which characterizes the communication network, is preferably available by way of the product data management system as a result of the data planning tool:
a) the switches used with their position and a reference to their type in the material list,
b) the network with cables including a reference to the cable type in the material list and an accurate description of the cable run,
c) utilization of the network cables,
d) the end-to-end delay times achieved for the specified logical configurations (communication relations) of the automation devices and
e) overall costs.

The planning platform preferably has a monitoring interface with the network planning tool, by way of which the current network planning status can be displayed. It is also preferable for the monitoring interface to be configured as a remote-procedure-call, with which status is requested by way of asynchronous polling. Communication at the monitoring interface is based on the polling principle for two reasons. Firstly the asynchronous form of communication prevents blocking of the very time-intensive network planning process. Secondly monitoring is used simply for supervision by the user, for whom it is not possible to track individual status changes consciously when these take place at time intervals of milliseconds.

The object directed toward a method is achieved by a method for planning a production unit, the production unit having a production building and manufacturing facilities, said manufacturing facilities also have machines with equipment for automation systems integrated at least partially in a communication network, with a product data management system, in which data relating to the product to be manufactured and further manufacture-related data is stored in a database, and with planning tools called up from a planning platform, which generate at least partially virtual mapping of the product, the production building and the manufacturing facilities, each planning tool obtaining the required product or unit information from the database for this purpose.

BRIEF DESCRIPTION OF THE DRAWINGS

The invention is described in more detail by way of example with reference to the drawing. The single FIGURE shows a schematic diagram of a device and method for planning a production unit.

DETAILED DESCRIPTION OF INVENTION

The device 1 for planning a production unit 3 allows the creation of a model of the production unit 3, in which a production building 5 and manufacturing facilities 7 are mapped. The manufacturing facilities 7 are equipped with automation systems and are connected by way of a communication network 9. The production unit 3 is designed to manufacture the product 19. The device 1 has a product data management system 11. The product data management system 11 is used to collate all planning-related data centrally. The data is stored in a database 13. The device 1 also has a planning platform 15. This planning platform 15 provides an environment, in which planning tools 17 are integrated. The planning platform 15 here is configured in a plug-in architecture so that the planning tools 17 can be called up as plug-ins. One of the planning tools 17 is a network planning tool 21. This has a monitoring interface 23, by way of which it is possible to display planning status in the network planning process.

The necessary network planning data is input first. This input data includes for example
a) a list of network elements that can be used,
b) the positions of the network adapters of all the automation devices,
c) the logical configuration of the automation devices, from which the communication protocols used result and therefore the induced network load,
d) the logical grouping of automation devices,
e) the quality-of-service requirements of the user,
f) the maximum permissible costs,
g) the restrictions for laying network cables and
h) network topology criteria.

This inputting can be carried out by the user, supported by corresponding extensions of the planning platform. Support could consist for example of the transformation of existing information by way of logical configurations or material flow relations into data of relevance to network planning, such as logical communication connections between automation devices or logical device groupings.

While inputting, the user can carry out a consistency check on the network planning data, thereby introducing a control.

An iterative planning process is also supported; in other words already planned parts of the unit with existing networks can also be integrated in the network planning.

The invention claimed is:

1. A device for planning a production unit for manufacturing a product, the production unit having a production building and manufacturing facilities, wherein the manufacturing facilities are connected by way of a communication network and are equipped with automation systems, the device comprising:
 a product data management system comprising a database in which data relating to the product to be manufactured and further manufacture-related data are stored, the product management system comprising a planning platform comprising planning tools for generating a virtual mapping of the product, the production building and the manufacturing facilities by accessing the database;
 a network planning tool integrated in the planning platform for receiving network planning data characterizing the communication network as input, wherein results from the network planning tool comprise end-to-end delay times achieved for specified logical configurations of the automation devices, wherein the results take into account actual influences of the communication network itself in the planning for the production unit; and
 a monitoring interface for displaying planning status information in the planning for the production unit.

2. The device as claimed in claim 1, wherein the planning platform has a plug-in architecture and the network planning tool is integrated as a plug-in.

3. The device as claimed in claim 1, wherein data characterizing the communication network as input for the network planning tool comprises:
 a list of network elements that can be used,
 positions of network adapters of all automation devices,
 a logical configuration of the automation devices, from which the communication protocols used result and therefore the induced network load,
 a logical grouping of the automation devices,
 quality-of-service requirement,
 maximum permissible costs,
 a restriction for laying a network cable, and
 a network topology criteria.

4. The device as claimed in claim 1, wherein the results of the network planning tool further comprise:
 switches used with their position and a reference to their type in a material list,
 network data with cable data including references to the cable type in the material list and an accurate description of the cable run,
 the utilization of network cables, and
 overall costs.

5. The device as claimed in claim 3, wherein the results of the network planning tool further comprise:
 switches used with their position and a reference to their type in a material list,
 network data with cable data including references to the cable type in the material list and an accurate description of the cable run,
 the utilization of network cables, and
 overall costs.

6. The device as claimed in claim 1, wherein the monitoring interface is configured as a remote-procedure-call for requesting status as asynchronous polling.

7. A method for planning a production unit for manufacturing a product, the production unit having a production building and manufacturing facilities, wherein the manufacturing facilities are connected by way of a communication network and are equipped with automation systems, the method comprising:

storing data relating to the product to be manufactured and further manufacture-related data in a database of a product data management system, the product management system comprising a planning platform comprising planning tools;

calling up by the product data management system the planning tools from the planning platform;

generating by the planning tools a virtual mapping of the product, the production building and the manufacturing facilities, wherein each planning tool obtains required product information or unit information from the database of the product data management system; and planning the communication network of the production unit by receiving network planning data characterizing the communication network as input for a network planning tool integrated in the planning platform, wherein results from the planning of the communication network by the network planning tool comprise end-to-end delay times achieved for specified logical configurations of the automation devices, wherein the results take into account actual influences of the communication network itself in the planning for the production unit; and displaying planning status information for the production unit.

8. The method as claimed in claim 7, further comprising:
inputting in the product data management system, wherein the inputted data is available for the network planning tool, one or more of the following:
a list of network elements that can be used,
positions of network adapters of all automation devices,
a logical configuration of the automation devices, from which the communication protocols used result and therefore the induced network load,
a logical grouping of the automation devices,
quality-of-service requirement,
maximum permissible costs,
a restriction for laying a network cable, and
a network topology criteria.

9. The method as claimed in claim 7, further comprising:
inputting in the product data management system, wherein the inputted data is available for the network planning tool, all of the following:
a list of network elements that can be used,
positions of network adapters of all automation devices,
a logical configuration of the automation devices, from which the communication protocols used result and therefore the induced network load,
a logical grouping of the automation devices,
quality-of-service requirement,
maximum permissible costs,
a restriction for laying a network cable, and
a network topology criteria.

10. The method as claimed in claim 7, further comprising:
invoking a remote-procedure-call for requesting the status information as asynchronous polling.

11. The method as claimed in claim 7, further comprising:
providing at least one of the following additional results via the product data management system generated based upon the network planning tool:
switches used with their position and a reference to their type in a material list,
network data with cable data including references to the cable type in the material list and an accurate description of the cable run,
the utilization of network cables, and
overall costs.

12. The method as claimed in claim 7, further comprising:
providing all of the following additional results via the product data management system generated based upon the network planning tool:
switches used with their position and a reference to their type in a material list,
network data with cable data including references to the cable type in the material list and an accurate description of the cable run,
the utilization of network cables, and
overall costs.

* * * * *